Figure 1:
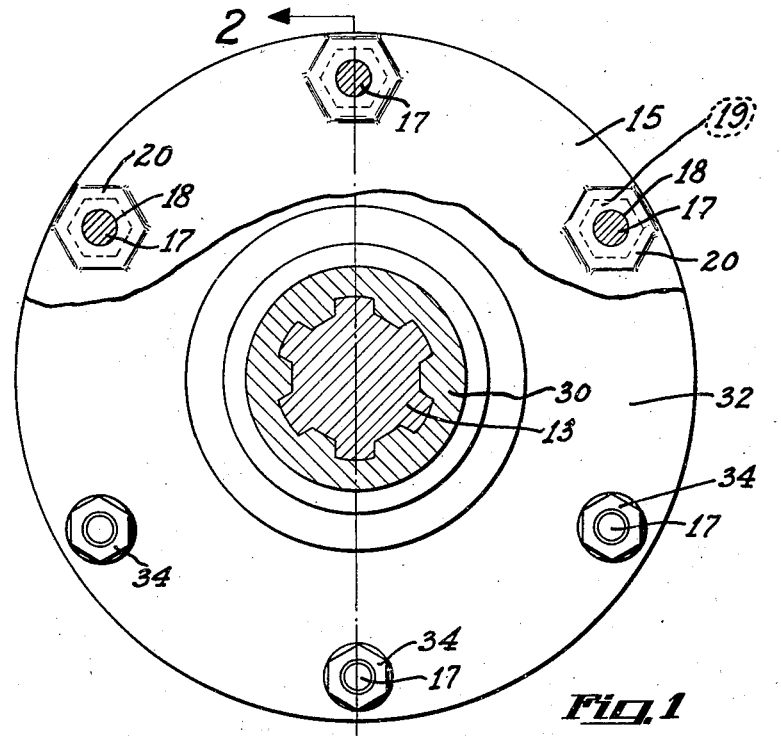

Aug. 18, 1936.  H. D. GEYER  2,051,442

RESILIENT COUPLING FOR TRANSMITTING POWER

Filed Sept. 15, 1933

INVENTOR
Harvey D. Geyer.
BY
Spencer Hardman & Fehr
his ATTORNEYS

Patented Aug. 18, 1936

2,051,442

UNITED STATES PATENT OFFICE 2,051,442

RESILIENT COUPLING FOR TRANSMITTING POWER

Harvey D. Geyer, Dayton, Ohio, assignor, by mesne assignments, to General Motors Corporation, Detroit, Mich., a corporation of Delaware Application September 15, 1933, Serial No. 689,642

1 Claim. (Cl. 64—11)

This invention relates to shaft couplings, especially such as are adapted for use in automobiles to couple the rear end of the propeller shaft to the pinion shaft of the differential unit.

An object of this invention is to provide a simple and efficient shaft coupling having a very substantial rotary yieldability whereby to cushion sudden shocks in the torque transmitted thereby.

Another object is to provide a metal-isolating coupling having relatively large rotary yieldability and relatively small axial yieldability.

A more specific object is to provide such a shaft coupling comprising an axially flattened resilient rubber ring which transmits the shaft torque by shear in the rubber, said rubber ring having its axial thickness increasing from its central portion to its outer portion whereby the torque stress upon the rubber ring is more evenly distributed throughout the body of the rubber, thus providing more efficient use of the rubber.

Another object is to provide such a coupling of simple construction, economical to make, and easy to connect or disconnect from the shafts.

Further objects and advantages of the present invention will be apparent from the following description, reference being had to the accompanying drawing wherein a preferred embodiment of one form of the present invention is clearly shown.

Figure 2:
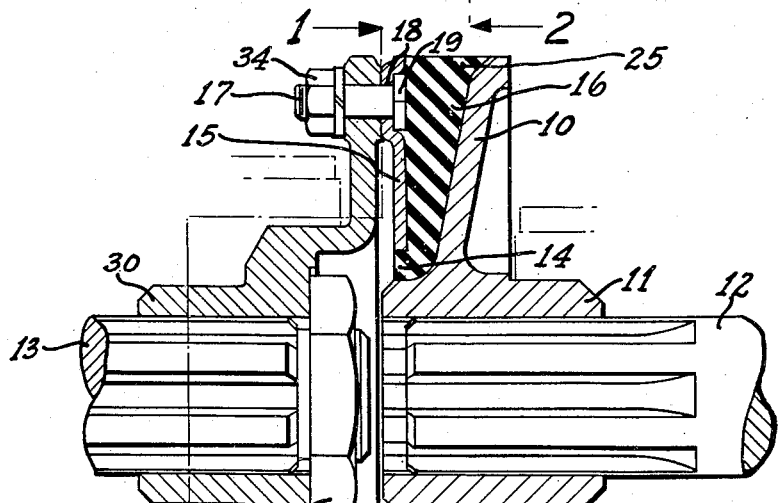

In the drawing:

Fig. 1 is a section taken on line 1—1 of Fig. 2.
Fig. 2 is a section taken on line 2—2 of Fig. 1.

Similar reference characters refer to similar parts throughout the several views.

10 designates a flat cone-shaped flange on the hub 11 which is splined to the end of spline shaft 12 of the differential pinion gear (not shown). An annular steel plate 15 is located in spaced relation to flange 10 and concentric thereto and the intervening resilient rubber ring 16 is strongly bonded by vulcanization in situ to the contacting surfaces of plate 15 and flange 10. This may be easily done by properly locating the metal parts 10 and 15 in the vulcanizing mold with the uncured rubber blank therebetween. Prior to such vulcanization the bolts 17 are inserted through the holes 18 around the periphery of plate 15 until their hexagon heads 19 are nested within the depressions 20 pressed in the plate 15. Thus these bolts 17 are permanently held in place by the rubber 16 covering their heads and being vulcanized thereto. The projecting shanks of bolts 17 may be used to properly locate the plate 15 in the vulcanizing mold. The rubber 16 preferably extends between the inner periphery of the annular plate 15 and the hub 11, as shown at 14, so that the plate 15 is held completely isolated from flange 10 regardless of any resilient distortion of the rubber during use of the coupling permitting these parts to become eccentric.

The thickness of the rubber ring 16 in an axial direction gradually increases from the inner periphery to the outer periphery of the annular plate 15 in order to proportion the thickness of the rubber at all radial distances from the center line of the connected shafts to the rotary deflection between the opposite points on the surfaces of plate 15 and flange 10. Thus the shearing stress on the rubber ring 16 caused by the transmission of power torque between the connected shafts will be substantially uniformly distributed throughout the body of the ring 16 instead of being concentrated at the outer periphery thereof as would be the case if the rubber contacting surfaces of plate 15 and flange 10 were parallel. An important feature of this invention therefore is such increasing thickness of the resilient rubber ring 16 from its inner periphery to its outer periphery according to the deflection at any point. Of course, this feature could be obtained, if desired, by having the flange 10 on a plane perpendicular to the shaft axis and having the annular plate 15 cone-shaped, or by having both flange 10 and plate 15 cone-shaped to the desired degree. It is a cheaper and simpler construction however to provide the cone-shape entirely in the cast flange 10 since this permits a plane metal disc 15 to be used. Preferably the rubber ring 16 has a still further and rather abruptly increased thickness at its outer periphery, as shown at 25. This greatly reduces the stress in the rubber ring 16 due to torque at its very outer edge and so reduces or eliminates the tendency of the rubber to start tearing loose from its bond with the metal surfaces at its outer edges.

The annular plate 15 is rigidly fixed to the end of the propeller shaft 13 by the flanged hub 30 which is suitably fixed to the shaft by splines and the end nut 31. Hub 30 has an integral flange 32 which is clamped rigidly against plate 15 by the bolts 17, lock washers 33, and nuts 34. Obviously, the coupling unit (comprising the hub 11 with its integral flange 10, the plate 15, and the rubber ring 16) may be very easily disconnected from the shafts simply by removing the nuts 34, swinging the shaft end 13 out of the way and then slipping the coupling unit from the end of shaft 12.

In operation, torque is transmitted by shear in the resilient rubber ring 16 as described above. Since the entire body of ring 16 is approximately equally stressed by such torque the rubber is efficiently used and sudden changes in the torque being transmitted through a wide range thereof is more efficiently cushioned by the relative rotary deflection between plate 15 and flange 10.

Obviously, the coupling unit is sufficiently flexible to properly provide for any small misalignment of the shafts 12 and 13 by the distortion of the resilient ring 16 to permit a change in the angle between plate 15 and flange 10. Also endwise vibrations between shafts 12 and 13 are cushioned and absorbed by direct axial tension or compression of the resilient ring 16. Thus this coupling unit will substantially prevent the transmission of sound vibrations from the propeller shaft 13 to the differential shaft 12, or vice versa.

While the form of embodiment of the present invention as herein disclosed, constitutes a preferred form, it is to be understood that other forms might be adopted, all coming within the scope of the claim which follows.

What is claimed is as follows:

A shaft coupling unit for transmitting power between two shafts connected thereby, comprising: a metal hub drivingly connected to one of the connected shafts, said hub having a conical surface thereon axially concentric thereto, a concentric annular metal plate spaced axially from said conical surface in opposed relation thereto and drivingly connected to the other of the connected shafts, and an axially flattened resilient rubber ring substantially filling the radially tapered space between said plate and conical surface and bonded thereto by vulcanization so as to transmit torque by shear in the rubber ring, said rubber ring having an axial thickness which increases substantially directly with the distance from the axis of the unit but having an abruptly increased axial thickness adjacent its outer periphery.

HARVEY D. GEYER.